(12) United States Patent
Yamada (10) Patent No.: US 10,116,247 B2
(45) Date of Patent: Oct. 30, 2018

(54) INVERTER DRIVE DEVICE AND SEMICONDUCTOR MODULE

(71) Applicant: FUJI ELECTRIC CO., LTD., Kawasaki-shi, Kanagawa (JP)

(72) Inventor: Tadanori Yamada, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 98 days.

(21) Appl. No.: 15/431,720

(22) Filed: Feb. 13, 2017

(65) Prior Publication Data

US 2017/0264230 A1 Sep. 14, 2017

(30) Foreign Application Priority Data

Mar. 10, 2016 (JP) .................... 2016-047056

(51) Int. Cl.

| | |
|---|---|
| *H02P 27/08* | (2006.01) |
| *H02M 1/08* | (2006.01) |
| *H02M 1/32* | (2007.01) |
| *H02M 7/5387* | (2007.01) |
| *H02M 1/00* | (2006.01) |
| *H02M 1/34* | (2007.01) |

(52) U.S. Cl.
CPC .............. *H02P 27/08* (2013.01); *H02M 1/08* (2013.01); *H02M 1/32* (2013.01); *H02M 7/5387* (2013.01); *H02M 2001/0009* (2013.01); *H02M 2001/344* (2013.01)

(58) Field of Classification Search
CPC ....................................................... H02P 27/08
USPC .................................................. 318/500, 494
See application file for complete search history.

(56) References Cited

U.S. PATENT DOCUMENTS

2001/0019660 A1\* 9/2001 Ohno .................... H02K 23/66
388/809

FOREIGN PATENT DOCUMENTS

JP          2009-253484 A      10/2009

\* cited by examiner

*Primary Examiner* — David S Luo
(74) *Attorney, Agent, or Firm* — Rabin & Berdo, P.C.

(57) ABSTRACT

An inverter drive device for driving a semiconductor switching element that controls an output current of an inverter. An inverter drive device includes a drive circuit configured to apply a drive voltage to the semiconductor switching element, to thereby turn the semiconductor switching element on and off, the turning off of the semiconductor switching element causing a counter electromotive force to be generated therein, a clamping diode configured to clamp a voltage of the generated counter electromotive force, a voltage dividing resistor configured to detect a voltage that is proportional to a current flowing through the clamping diode, and an auxiliary drive circuit configured to generate a control voltage in accordance with the voltage detected by the voltage dividing resistor, and to apply the control voltage to the semiconductor switching element, to thereby turn the semiconductor switching element on.

18 Claims, 4 Drawing Sheets

INVERTER DRIVE DEVICE AND SEMICONDUCTOR MODULE

BACKGROUND OF THE INVENTION

1. Field of the Invention

The present invention relates to an inverter drive device that drives on and off a semiconductor switching element provided in an inverter output stage and controlling current output to a load, and relates to a semiconductor module in which the inverter drive device and semiconductor switching element are integrally included.

2. Description of the Background Art

Figure 3:
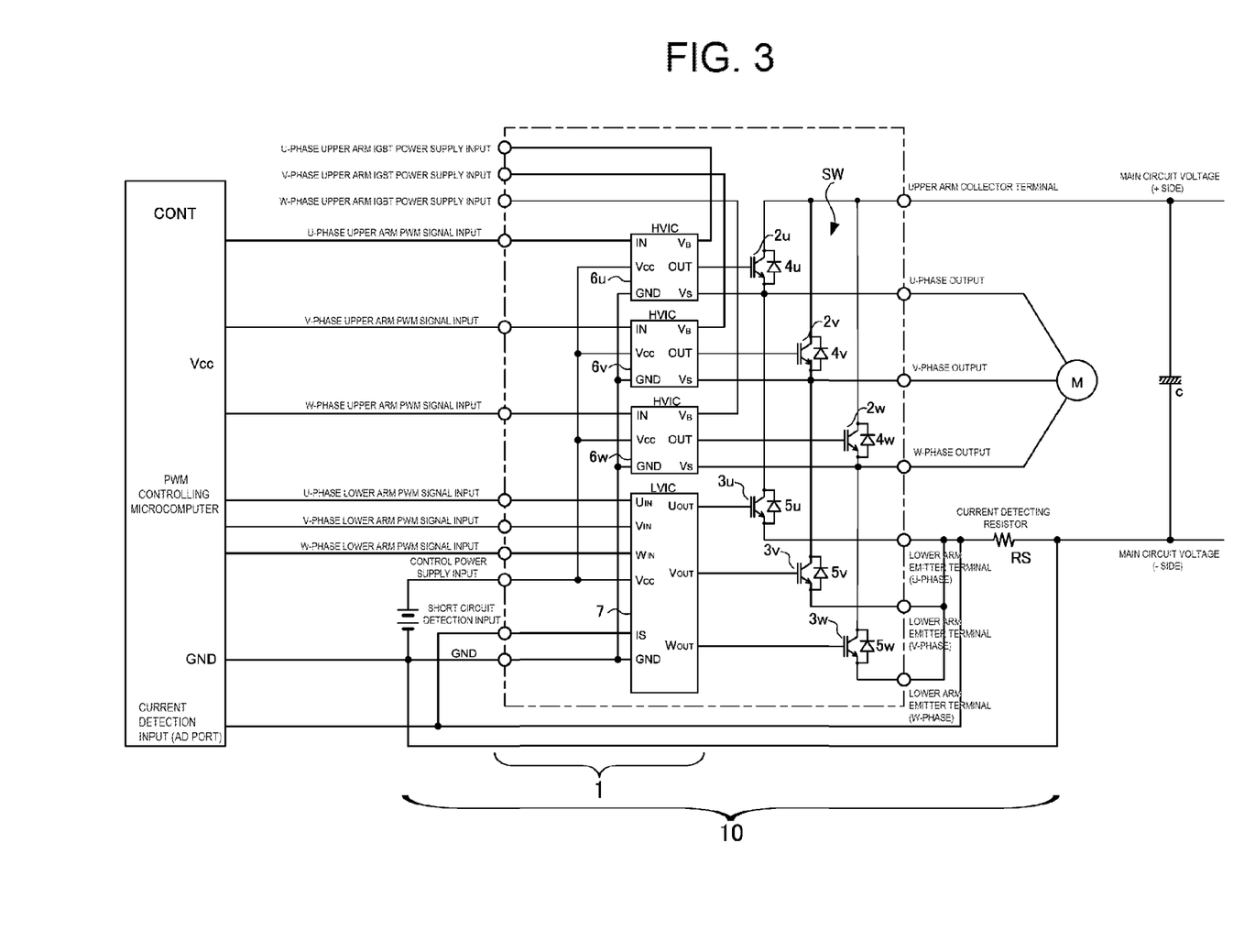
FIG. 3 is a configuration diagram showing an example of a 3-phase motor driving inverter.

An inverter 10 that drives a single-phase motor, 3-phase motor, or the like, includes in an output stage thereof a semiconductor switching element SW that controls current output to a load, and is configured to include an inverter drive device 1 that drives the semiconductor switching element SW on and off. FIG. 3 is a diagram showing a schematic configuration of the inverter 10, which drives a 3-phase motor M acting as a load, wherein the inverter 10 includes, as the semiconductor switching element SW, upper arm IGBTs (insulated gate bipolar transistors) 2u, 2v, and 2w and lower arm IGBTs 3u, 3v, and 3w, totem pole connected and driven on in a complementary way, in a U-phase, V-phase, and W-phase respectively. Freewheeling diodes 4u, 4v, 4w, 5u, 5v, and 5w are connected in anti-parallel between an emitter and collector of the upper arm IGBTs 2u, 2v, and 2w and lower arm IGBTs 3u, 3v, and 3w respectively.

Herein, the totem pole connection of the upper arm IGBTs 2u, 2v, and 2w and lower arm IGBTs 3u, 3v, and 3w indicates a circuit configuration wherein the emitters of the upper arm IGBTs 2u, 2v, and 2w are connected to the collectors of the lower arm IGBTs 3u, 3v, and 3w respectively. Each series circuit of the totem pole connected upper arm IGBTs 2u, 2v, and 2w and lower arm IGBTs 3u, 3v, and 3w forms a half-bridge circuit.

Also, the inverter drive device 1 includes upper arm drive circuits (HVICs) 6u, 6v, and 6w, which drive the upper arm IGBTs 2u, 2v, and 2w respectively on and off, and a lower arm drive circuit (LVIC) 7, which drives each of the lower arm IGBTs 3u, 3v, and 3w on and off. The upper arm drive circuits 6u, 6v, and 6w and lower arm drive circuit 7 take in control signals, specifically U-phase, V-phase, and W-phase PWM (Pulse Width Modulation) signals, provided individually from a control device CONT formed of, for example, a PWM controlling microcomputer, thereby driving the upper arm IGBTs 2u, 2v, and 2w and lower arm IGBTs 3u, 3v, and 3w on and off with predetermined phase differences.

Also, a current detecting resistor RS is interposed in a power supply path of the semiconductor switching element SW formed of the totem pole connected upper arm IGBTs 2u, 2v, and 2w and lower arm IGBTs 3u, 3v, and 3w. The current detecting resistor RS detects voltage proportional to current flowing in the inverter 10 as current information, and the detected current information is input into each of the control device CONT and lower arm drive circuit 7.

For example, an abnormality such as an interphase short circuit, caused by an insulation failure or incorrect wiring in output wiring of the inverter 10, is detected from the current information. In particular, the lower arm drive circuit 7 includes an overcurrent protection function that immediately and directly turns off the lower arm IGBTs 3u, 3v, and 3w when an excessive current is detected, thereby interrupting the current flowing into the lower arm IGBTs 3u, 3v, and 3w. Also, the control device CONT includes an overcurrent protection function that outputs control current information to the upper arm drive circuits 6u, 6v, and 6w when an excessive current is detected, whereby the upper arm IGBTs 2u, 2v, and 2w respectively are controlled so as to be turned off.

Figure 4:
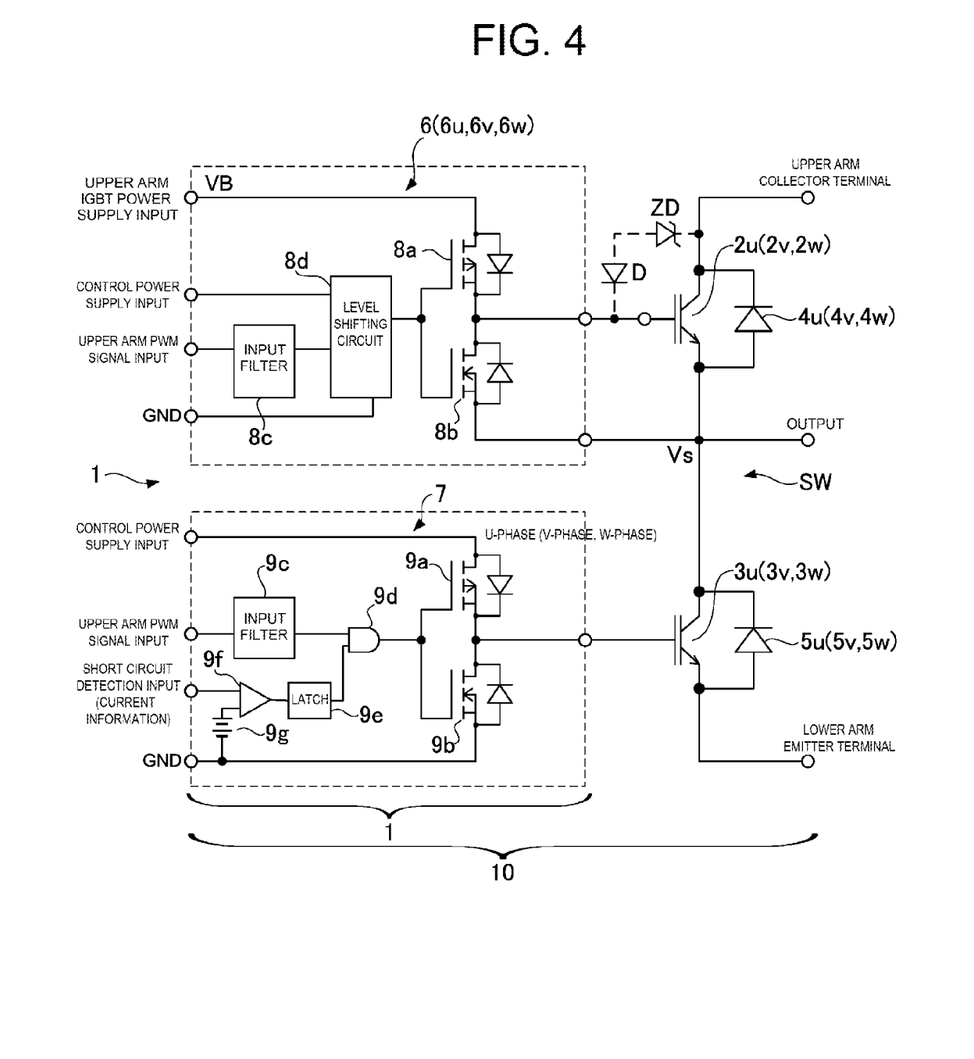
FIG. 4 is a diagram showing a schematic configuration of an existing typical inverter drive device.

Herein, a simple description will be given of the upper arm drive circuits 6u, 6v, and 6w and lower arm drive circuit 7 in the inverter drive device 1. FIG. 4 is a schematic configuration diagram wherein the inverter drive device 1 of a single phase, in this case the U-phase, of the inverter 10 is extracted. The inverter drive devices 1 of the V-phase and W-phase are configured in the same way.

The upper arm drive circuit 6 (6u, 6v, 6w) includes a P-MOS (P-type Metal-Oxide-Semiconductor) 8a and N-MOS (N-type Metal-Oxide-Semiconductor) 8b, connected in series and driven on and off in a complementary way, as output stage transistors that drive the upper arm IGBT 2u (2v, 2w) on and off. Herein, the output stage transistors formed of the P-MOS 8a and N-MOS 8b drive the upper arm IGBT 2u (2v, 2w) on and off by being turned on and off in a complementary way, with voltage at a connection point of the totem pole connected upper arm IGBT 2u (2v, 2w) and lower arm IGBT 3u (3v, 3w), that is, an intermediate voltage Vs, as a reference potential.

Also, the upper arm drive circuit 6 (6u, 6v, 6w) includes an input filter 8c that takes in a control signal (PWM signal) provided from the control device CONT, and a level shifting circuit 8d that shifts the level of the control signal (PWM signal) taken in via the input filter 8c to the level of the output stage transistor operation reference potential. Further, the upper arm drive circuit 6 (6u, 6v, 6w) is configured so as to drive the output stage transistor (P-MOS 8a, N-MOS 8b) on and off using the control signal (PWM signal) whose level has been shifted by the level shifting circuit 8d.

When the control device CONT detects an occurrence of an overcurrent from the current information (detected voltage) detected via the current detecting resistor RS, the control device CONT stops the output of the control signal (PWM signal). Because of this, the drive of the P-MOS 8a and N-MOS 8b stops, and the upper arm IGBT 2u (2v, 2w) is controlled so as to be forcibly turned off.

Meanwhile, the U-phase (V-phase, W-phase) of the lower arm drive circuit 7 includes a P-MOS 9a and N-MOS 9b, connected in series and driven on and off in a complementary way, as output stage transistors that drive the lower arm IGBT 3u (3v, 3w) on and off. The output stage transistors formed of the P-MOS 9a and N-MOS 9b drive the lower arm IGBT 3u (3v, 3w) on and off by being turned on and off in a complementary way, with a ground potential GND as a reference potential.

Also, the lower arm drive circuit 7 includes an input filter 9c that takes in a control signal (PWM signal) provided from the control device CONT, and an AND gate circuit 9d that controls output to the output stage transistor (P-MOS 9a, N-MOS 9b) of the control signal (PWM signal) taken in via the input filter 9c. The AND gate circuit 9d performs a role of driving the P-MOS 9a and N-MOS 9b on and off in a complementary way by outputting the control signal (PWM signal) to the output stage transistor (P-MOS 9a, N-MOS 9b) only when an output of a latch circuit 9e is at "H".

Herein, the current information (detected voltage) detected via the current detecting resistor RS is provided to a comparator 9f, and compared with a predetermined reference voltage 9g. When the detected voltage exceeds the reference voltage 9g, the comparator 9f detects this as an occurrence of an overcurrent, and sets the output of the latch circuit 9e at "L". By the output of the latch circuit 9e being set at "L" due to the overcurrent detection, the AND gate circuit 9d is closed, and the drive of the output stage transistor (P-MOS 9a, N-MOS 9b) by the control signal (PWM signal) is forcibly prohibited. As a result of this, the lower arm IGBT 3u (3v, 3w) is controlled so as to be forcibly turned off when an overcurrent is detected.

Herein, the inverter 10 configured to include the inverter drive device 1 configured as heretofore described is such that when, for example, an interphase short circuit occurs in the output wiring and an overcurrent (short circuit current) flows, the lower arm drive circuit 7 promptly detects the occurrence of the overcurrent, and controls the lower arm IGBTs 3u, 3v, and 3w so as to be turned off. Meanwhile, the control device CONT detects an occurrence of an overcurrent (short circuit current), and stops the main power of the control signal (PWM signal), because of which it cannot be denied that there is a slight delay in the upper arm drive circuits 6u, 6v, and 6w controlling the upper arm IGBTs 2u, 2v, and 2w so as to be turned off.

Herein, when the upper arm IGBTs 2u, 2v, and 2w and lower arm IGBTs 3u, 3v, and 3w are forcibly turned off, a reflux current flows into the upper arm IGBTs 2u, 2v, and 2w due to an inductance component existing in internal wiring of the upper arm drive circuit 6 (6u, 6v, 6w). As the current flowing immediately before the upper arm IGBTs 2u, 2v, and 2w and lower arm IGBTs 3u, 3v, and 3w are controlled so as to be forcibly turned off is an overcurrent (short circuit current), the reflux current flowing at this time is ten times or more greater than a reflux current flowing when the inverter operates normally.

Therefore, an amount of current change (−dIc/dt) when the upper arm IGBTs 2u, 2v, and 2w are forcibly turned off is 1,000 A/µs or more, which is ten times or more greater than the amount of current change (−dIc/dt) at a time of normal operation. As a result of this, a counter electromotive force caused by the inductance component existing in the internal wiring and the amount of current change (−dIc/dt) is applied unchanged to the upper arm IGBTs 2u, 2v, and 2w. Further, when the counter electromotive force exceeds a breakdown voltage between the collectors and emitters of the upper arm IGBTs 2u, 2v, and 2w, and a breakdown voltage between the cathodes and anodes of the freewheeling diodes 4u, 4v, and 4w, there is concern that the upper arm IGBTs 2u, 2v, and 2w will reach overvoltage breakdown.

In order to combat this kind of problem, consideration is being given to increasing the breakdown voltage between the collectors and emitters of the upper arm IGBTs 2u, 2v, and 2w and the breakdown voltage between the cathodes and anodes of the freewheeling diodes 4u, 4v, and 4w with respect to the counter electromotive force generated due to the amount of current change (−dIc/dt) when the current is interrupted. However, as the breakdown voltage between the collectors and emitters of the upper arm IGBTs 2u, 2v, and 2w and conduction loss thereof are in a trade-off relationship, a new problem occurs in that loss in the upper arm IGBTs 2u, 2v, and 2w when the upper arm drive circuit 6 (6u, 6v, 6w) operates normally increases, and the operating efficiency of the inverter 10 worsens.

With regard to this, a case wherein a clamping diode (Zener diode) ZD combating counter electromotive force and a current backflow blocking diode (reverse blocking diode) D are interposed in series between the collector and a gate of the upper arm IGBT 2u (2v, 2w), as shown by a broken line in FIG. 4, and the voltage of counter electromotive force applied to the upper arm IGBT 2u (2v, 2w) is clamped by the clamping diode ZD, is disclosed in, for example, JP-A-2009-253484.

According to the inverter 10 configured to include this kind of clamping diode ZD and reverse blocking diode D, energy of the counter electromotive force applied to the upper arm IGBT 2u (2v, 2w) can be caused to flow from the gate side of the upper arm IGBT 2u (2v, 2w) into the upper arm drive circuit 6 (6u, 6v, 6w) as breakdown current Ir of the clamping diode ZD. Therefore, voltage is generated at both ends of an equivalent internal impedance of the upper arm drive circuit 6 (6u, 6v, 6w) by the breakdown current Ir flowing into the upper arm drive circuit 6 (6u, 6v, 6w) via the clamping diode ZD, and this voltage is applied to the gate of the upper arm IGBT 2u (2v, 2w).

Therefore, the internal impedance (an equivalent gate resistance RG) of the upper arm drive circuit 6 (6u, 6v, 6w) seen from the upper arm IGBT 2u (2v, 2w) side is set so that, for example, voltage applied to the gate of the upper arm IGBT 2u (2v, 2w) exceeds an operational threshold of the upper arm IGBT 2u (2v, 2w), and a collector current flows owing to a saturated operation of the upper arm IGBT 2u (2v, 2w). Therefore, the upper arm IGBT 2u (2v, 2w) is turned on in a saturated operation state, because of which the energy of the counter electromotive force applied to the upper arm IGBT 2u (2v, 2w) flows via the upper arm IGBT 2u (2v, 2w).

As a result of this, the energy of the counter electromotive force can be consumed as heat energy by the upper arm IGBT 2u (2v, 2w). Consequently, the voltage of the counter electromotive force applied to the upper arm IGBT 2u (2v, 2w) can be restricted by the clamping diode ZD, whereby overvoltage breakdown of the upper arm IGBT 2u (2v, 2w) can be effectively prevented.

Note that in order for the upper arm IGBT 2u (2v, 2w) to be turned on in a saturated operation state, a voltage of approximately 6V is needed as a gate voltage thereof. Also, the internal impedance (equivalent gate resistance RG) of the upper arm drive circuit 6 (6u, 6v, 6w) is generally in the range of 10 to 50Ω. Therefore, in order to obtain a gate voltage of approximately 6V, the breakdown current Ir flowing via the clamping diode ZD needs to be a maximum of 600 mA. Therefore, in order to reduce a clamping operation resistance of the clamping diode ZD, it is necessary to secure a chip area of the same extent as that of the upper arm IGBT 2u (2v, 2w) as the clamping diode ZD, and problems occur in that circuit area increases, system cost increases, and the like.

Meanwhile, when envisaging a clamping diode ZD of a small chip area that can conceivably be embedded in the chip of the upper arm drive circuit 6 (6u, 6v, 6w), the breakdown current Ir flowing into the clamping diode ZD decreases to an amount close to, for example, 100 µA. Therefore, in order to generate a gate voltage of approximately 6V when the upper arm IGBT 2u (2v, 2w) is turned on in a saturated operation state, it is necessary that the internal impedance (equivalent gate resistance RG) of the upper arm drive circuit 6 (6u, 6v, 6w) is of an amount close to, for example, 60 kΩ.

When increasing the internal impedance of the upper arm drive circuit 6 (6u, 6v, 6w) in this way, switching loss in the upper arm IGBT 2u (2v, 2w) when the inverter 10 is operating normally increases. Further, the amount of heat generated in accompaniment to the upper arm IGBT 2u (2v, 2w) being turned on increases, and a switching operation at or above 10 kHz, which is a general switching frequency in the inverter 10, is difficult.

SUMMARY OF THE INVENTION

The invention provides an inverter drive device such that, while restricting unwanted loss when a semiconductor switching element provided in an inverter output stage is operating normally, an overvoltage breakdown of the semiconductor switching element due to counter electromotive force applied to the semiconductor switching element at a time of an abnormal state can be reliably prevented.

At the same time, the invention provides a semiconductor module configured to integrally include the semiconductor switching element provided in the inverter output stage and an inverter drive device that drives the semiconductor switching element on and off.

An inverter drive device according to the invention includes a main drive circuit that applies drive voltage to a semiconductor switching element provided in an inverter output stage and controlling current output to a load, thereby driving the semiconductor switching element on and off, and in particular, is characterized by including a clamping diode that clamps voltage of a counter electromotive force applied to the semiconductor switching element when operation of the main drive circuit stops, a voltage dividing resistor that resistively divides and detects voltage proportional to a current flowing out via the clamping diode when clamping counter electromotive force voltage, and an auxiliary drive circuit that generates a control voltage in accordance with voltage detected by the voltage dividing resistor and applies the control voltage to the semiconductor switching element, thereby turning the semiconductor switching element on.

Herein, the semiconductor switching element is, for example, an IGBT, and the main drive circuit applies the drive voltage to a gate of the IGBT, thereby driving the IGBT on and off. Also, the auxiliary drive circuit applies the control voltage to the gate of the IGBT, thereby turning the IGBT on in a saturated operation region. Herein, the clamping diode is formed of a Zener diode having a cathode-to-anode breakdown voltage lower than a collector-to-emitter breakdown voltage of the IGBT.

Specifically, the main drive circuit applies the drive voltage to the gate of the IGBT via a gate resistor when the inverter is operating normally, and the auxiliary drive circuit applies the control voltage to the gate of the IGBT via an output resistor when the inverter is in an abnormal state. Also, the auxiliary drive circuit is provided in parallel with the main drive circuit.

The semiconductor switching element is, for example, an upper arm IGBT and lower arm IGBT, totem pole connected and alternately driven on, and the main drive circuit is formed of an upper arm drive circuit that drives the upper arm IGBT on and off and a lower arm drive circuit that drives the lower arm IGBT on and off. Further, the auxiliary drive circuit is provided in the upper arm drive circuit, and performs a role of protecting the upper arm IGBT from counter electromotive force applied to the upper arm IGBT when the upper arm IGBT is turned off with the lower arm IGBT in an off-state.

Also, a semiconductor module according to the invention is characterized by integrally including a semiconductor switching element, provided in an inverter output stage and controlling current output to a load, and the inverter drive device of the heretofore described configuration that drives the semiconductor switching element on and off. Alternatively, a semiconductor module according to the invention is characterized in that two phases or three phases of the semiconductor switching element and the inverter drive device of the heretofore described configuration that drives the semiconductor switching element on and off are integrally provided in parallel.

Herein, a multiple of the inverter drive device provided in parallel for two or three phases individually drive on and off a multiple of the semiconductor switching element provided in parallel with a predetermined phase difference.

According to the inverter drive device and semiconductor module of the heretofore described configurations, the semiconductor switching element (for example, an IGBT) can be turned on in a saturated operation region by the auxiliary drive circuit, even when an abnormal reflux current flows into the semiconductor switching element due to the semiconductor switching element (IGBT) being forcibly turned off when the inverter is in an abnormal state. Further, energy of a counter electromotive force applied to the semiconductor switching element due to the abnormal reflux current can be effectively consumed by the semiconductor switching element. As a result of this, an overvoltage breakdown of the semiconductor switching element due to the counter electromotive force caused by the abnormal reflux current can be reliably prevented.

Also, as the auxiliary drive circuit does not drive the semiconductor switching element in place of the main drive circuit when the inverter is operating normally, the existence of the auxiliary drive circuit is not a factor in increasing loss in the semiconductor switching element. Consequently, a large number of practical advantages are obtained, such as being able to reliably prevent an overvoltage breakdown of the semiconductor switching element when there is an abnormal state such as an inverter output short circuit, while restricting loss in the semiconductor switching element at a time of normal operation, thereby maintaining the efficiency of the inverter.

DETAILED DESCRIPTION OF THE INVENTION

Hereafter, referring to the drawings, a description will be given of an inverter drive device according to an embodiment of the invention, with a U-phase inverter drive device in a 3-phase motor driving inverter as an example. The same reference signs will be allotted to portions the same as in an existing device shown in FIGS. 3 and 4, and a description thereof will be omitted. Also, V-phase and W-phase inverter drive devices in the 3-phase motor driving inverter are configured in the same way as the U-phase inverter drive device described here.

Figure 1:
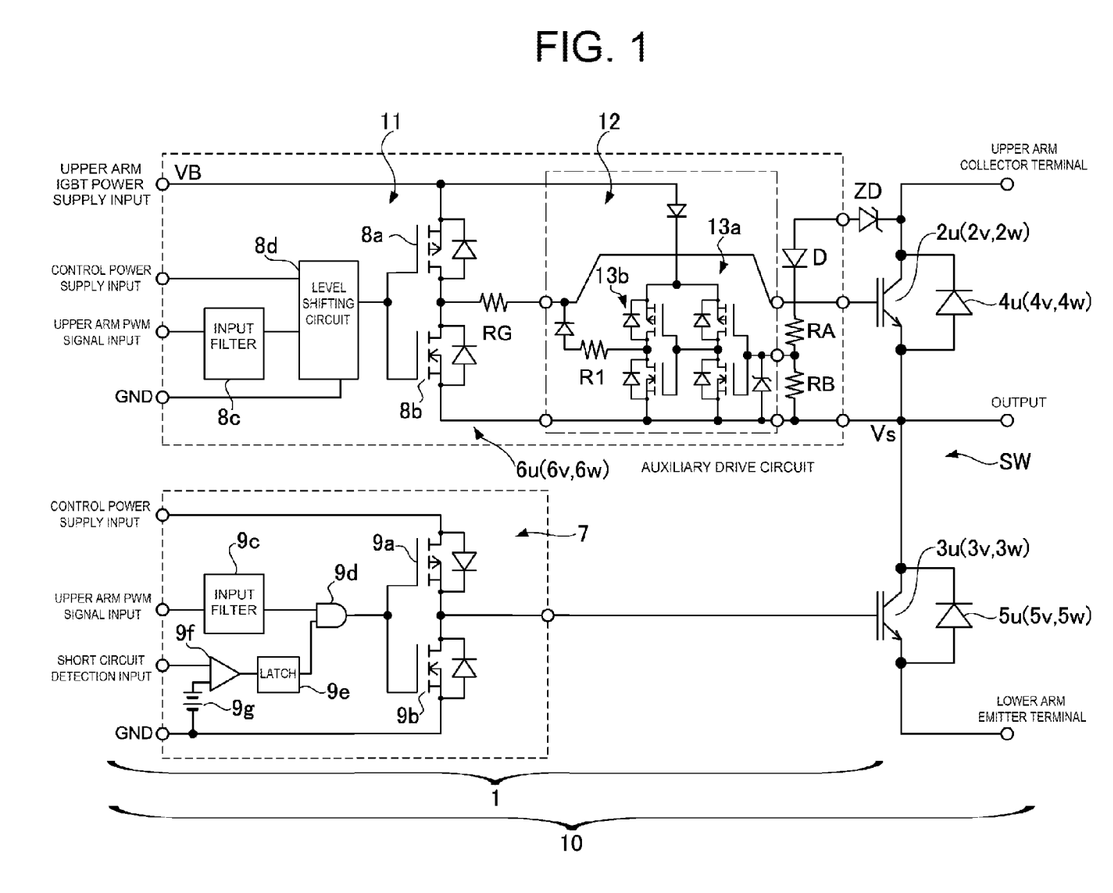
FIG. 1 is a diagram showing a main portion schematic configuration of an inverter drive device according to an embodiment of the invention.

An inverter drive device 1 according to an embodiment of the invention, as shown in a schematic configuration thereof in FIG. 1, includes a main drive circuit 11 that applies drive voltage to a semiconductor switching element SW provided in an output stage of an inverter 10 and controlling current output to a load, thereby driving the semiconductor switching element SW on and off.

The semiconductor switching element SW is formed of an upper arm IGBT 2*u* (2*v*, 2*w*) and a lower arm IGBT 3*u* (3*v*, 3*w*), totem pole connected and driven on in a complementary way. Herein, freewheeling diodes 4u, 4v, 4w, 5u, 5v, and 5w are connected in anti-parallel between an emitter and collector of the upper arm IGBT 2u (2v, 2w) and lower arm IGBT 3u (3v, 3w) respectively. Also, the main drive circuit 11 is formed of an upper arm drive circuit 6u (6v, 6w), which drives the upper arm IGBT 2u (2v, 2w) on and off, and a lower arm drive circuit 7, which drives the lower arm IGBT 3u (3v, 3w) on and off. Only a U-phase drive circuit is extracted from the lower arm drive circuit 7, which includes U-phase, V-phase, and W-phase drive circuits, and shown in FIG. 1.

The inverter drive device 1 according to the embodiment of the invention is characterized by including a clamping diode ZD, which clamps the voltage of a counter electromotive force applied to the semiconductor switching element SW, particularly the upper arm IGBT 2u (2v, 2w), when operation of the main drive circuit stops, and voltage dividing resistors RA and RB, which resistively divide and detect voltage proportional to a current flowing out via the clamping diode ZD when the counter electromotive force voltage is clamped by the clamping diode ZD. A reverse blocking diode D, which blocks current backflow, is connected in series to the clamping diode ZD.

Specifically, the clamping diode ZD is such that a cathode thereof is connected to a collector of the upper arm IGBT 2u (2v, 2w), and an anode of the reverse blocking diode D is provided connected to an anode of the clamping diode ZD. Further, a cathode of the reverse blocking diode D is connected via the serially connected voltage dividing resistors RA and RB to a power supply line of an intermediate point voltage Vs, which regulates a reference potential of the upper arm drive circuit 6u (6v, 6w). Consequently, current generated by the clamping diode ZD clamping the counter electromotive force voltage flows via the reverse blocking diode D into the voltage dividing resistors RA and RB, and the voltage dividing resistors RA and RB divide and detect a voltage proportional to this current.

Furthermore, the inverter drive device 1 is characterized by including an auxiliary drive circuit 12, which generates a control voltage in accordance with voltage detected by the voltage dividing resistors RA and RB, and applies the control voltage to the upper arm IGBT 2u (2v, 2w) in place of the main drive circuit 11 in the upper arm drive circuit 6u (6v, 6w). The auxiliary drive circuit 12 performs a role of turning the upper arm IGBT 2u (2v, 2w) on in a saturated operation region when, for example, the lower arm IGBT 3u (3v, 3w) is controlled so as to be forcibly turned off due to generation of a short circuit current, in accompaniment to which counter electromotive force is applied to the upper arm IGBT 2u (2v, 2w).

That is, the upper arm drive circuit 6u (6v, 6w) is configured to include in parallel the main drive circuit 11, which drives the upper arm IGBT 2u (2v, 2w) on and off at a time of normal operation, and the auxiliary drive circuit 12, which turns the upper arm IGBT 2u (2v, 2w) on in a saturated operation region when counter electromotive force is applied to the upper arm IGBT 2u (2v, 2w) in an abnormal state.

Herein, the auxiliary drive circuit 12 is configured to include inverting amplifiers 13a and 13b connected in two stages. The inverting amplifiers 13a and 13b are configured respectively of, for example, a P-MOS and N-MOS connected in series. The first stage inverting amplifier 13a inversely amplifies voltage generated across the voltage dividing resistor RB by current flowing into the voltage dividing resistors RA and RB via the clamping diode ZD. Further, the second stage inverting amplifier 13b inversely amplifies output voltage of the first stage inverting amplifier 13a, and generates a control voltage for turning on the upper arm IGBT 2u (2v, 2w) in a saturated operation region. The control voltage is generated as, for example, a voltage approximately equal to a power supply voltage VB applied to the auxiliary drive circuit 12.

The control voltage output by the auxiliary drive circuit 12 in this way is divided by internal impedance of the upper arm drive circuit 6u (6v, 6w), particularly an equivalent internal impedance (gate resistance) RG of the main drive circuit 11 and output resistance R1 of the auxiliary drive circuit 12, and applied to a gate of the upper arm IGBT 2u (2v, 2w). The upper arm IGBT 2u (2v, 2w) is turned on in a saturated operation region by the control voltage applied in this way, and energy of counter electromotive force applied to the upper arm IGBT 2u (2v, 2w) flows via the upper arm IGBT 2u (2v, 2w). As a result of this, the counter electromotive force energy is consumed as heat energy in the upper arm IGBT 2u (2v, 2w), because of which overvoltage breakdown of the upper arm IGBT 2u (2v, 2w) can be prevented.

A diode interposed between the output resistance R1 and an output end of the main drive circuit 11 performs a role of preventing the output voltage (control voltage) of the auxiliary drive circuit 12 from being applied to the output end of the main drive circuit 11 at a time of normal operation. Owing to this diode, the drive voltage of the main drive circuit 11 at a time of normal operation is applied to the upper arm IGBT 2u (2v, 2w) without being affected by the output voltage of the auxiliary drive circuit 12.

According to the upper arm drive circuit 6u (6v, 6w) wherein the auxiliary drive circuit 12 that outputs control voltage in accordance with current flowing via the clamping diode ZD is included in parallel with the main drive circuit 11, as heretofore described, counter electromotive force energy applied to the upper arm IGBT 2u (2v, 2w) can be effectively consumed as heat energy by the upper arm IGBT 2u (2v, 2w) being turned on in a saturated operation region. Consequently, even when operation of the main drive circuit 11 stops when an abnormal situation occurs, in accompaniment to which a counter electromotive force is applied to the upper arm IGBT 2u (2v, 2w), an overvoltage breakdown of the upper arm IGBT 2u (2v, 2w) caused by counter electromotive force energy can be effectively prevented.

Moreover, according to the heretofore described configuration, the existence of the auxiliary drive circuit 12 does not hinder the function of the main drive circuit 11. Consequently, the upper arm IGBT 2u (2v, 2w) can be driven on and off by the drive voltage output from the main drive circuit 11 at a time of normal operation, because of which switching loss in the upper arm IGBT 2u (2v, 2w) does not increase.

Furthermore, the clamping diode ZD simply clamps the voltage of counter electromotive force energy applied to the upper arm IGBT 2u (2v, 2w), and causes the amount of energy whose voltage has been clamped to flow as breakdown current Ir into the voltage dividing resistors RA and RB. Consequently, the breakdown current Ir flowing via the clamping diode ZD can be reduced. Therefore, a chip area of the clamping diode ZD can be reduced, while keeping clamping operation resistance of the clamping diode ZD low. As a result of this, for example, the clamping diode ZD can also be embedded integrally in the upper arm drive circuit 6u (6v, 6w).

Also, as there is no need for the main drive circuit 11 to generate a gate voltage necessary in order for the upper arm IGBT 2u (2v, 2w) to be turned on in a saturated operation state in an abnormal state, as is the case to date, there is no need either to increase the internal impedance (gate resistance) RG of the main drive circuit 11. Consequently, there is nothing to bring about an increase in switching loss in the upper arm IGBT 2u (2v, 2w) when the inverter 10 is operating normally. Therefore, a switching operation at or above 10 kHz, which is a general switching frequency in the inverter 10, is easily secured.

Figure 2:
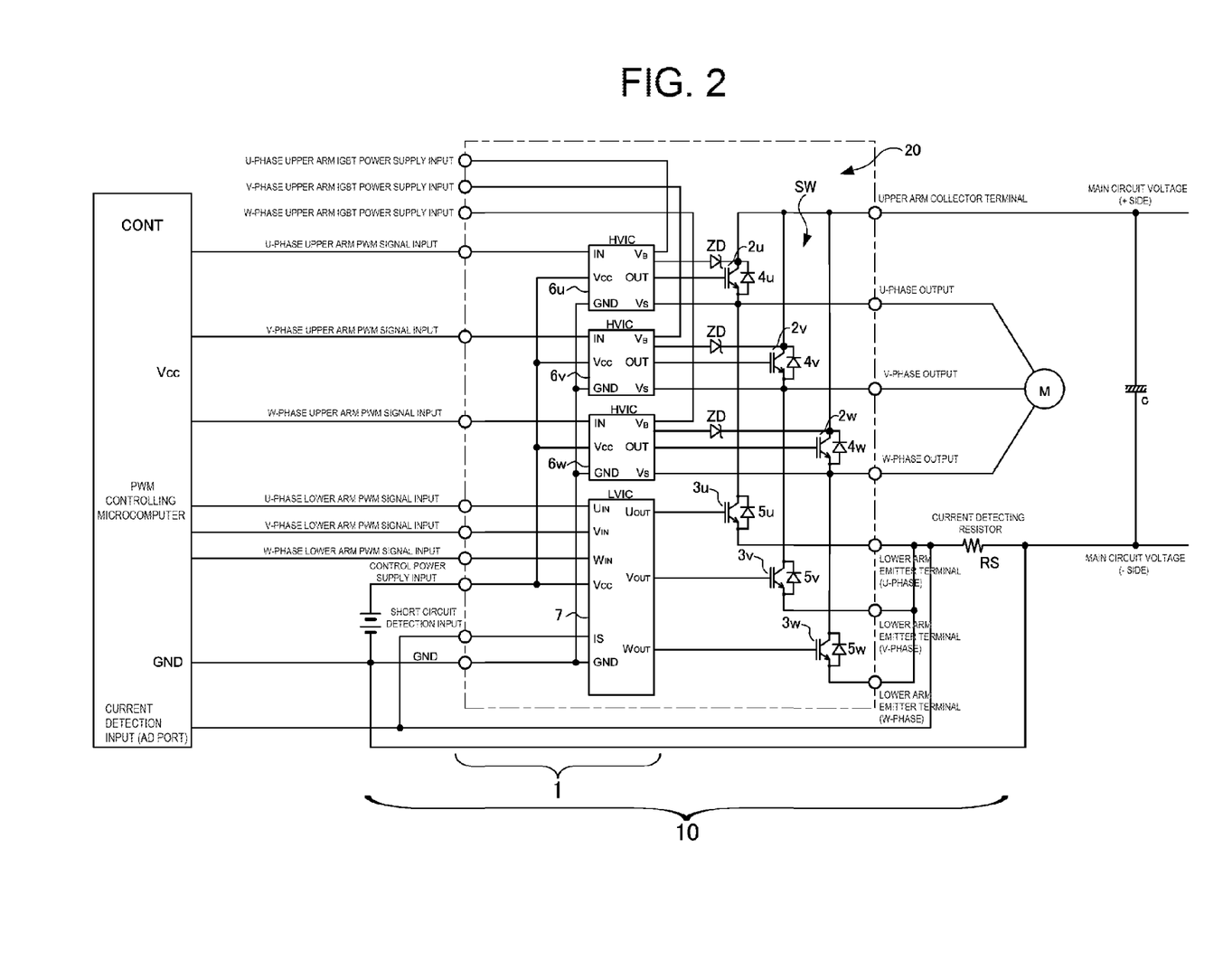
FIG. 2 is a diagram showing a schematic configuration of a semiconductor module according to an embodiment of the invention in which a 3-phase motor driving inverter is constructed.

FIG. 2 shows a schematic configuration of the 3-phase motor driving inverter 10 configured to include the U-phase, V-phase, and W-phase upper arm drive circuits 6u, 6v, and 6w, each of which includes the auxiliary drive circuit 12, and the lower arm drive circuit 7. In particular, the inverter 10 is configured so that the clamping diode ZD is connected to a collector of each of the upper arm IGBTs 2u, 2v, and 2w, and current is caused to flow via the clamping diodes ZD into the voltage dividing resistors RA and RB, shown in FIG. 1, embedded in the upper arm drive circuit 6u (6v, 6w).

The U-phase, V-phase, and W-phase upper arm drive circuits 6u, 6v, and 6w and the lower arm drive circuit 7 are integrated with the semiconductor switching element SW formed of the totem pole connected upper arm IGBTs 2u, 2v, and 2w and lower arm IGBTs 3u, 3v, and 3w, and with the three clamping diodes ZD, whereby one semiconductor module 20 is constructed. This semiconductor module 20 is called an intelligent power module (IPM). As this kind of semiconductor module 20 is such that the breakdown current Ir of the clamping diode ZD is small and the clamping operation resistance is low, it is sufficient that a clamping diode ZD with a small chip area is mounted. Consequently, the semiconductor module 20 can be realized as a compact semiconductor module.

When using the semiconductor module 20 configured in this way, the inverter 10 that drives, for example, a 3-phase motor M can be easily realized. At the same time, overvoltage breakdown of the upper arm IGBTs 2u, 2v, and 2w when an abnormal state, such as a short circuit accident in output wiring of the inverter 10, occurs can be reliably prevented. Consequently, there are a large number of practical advantages of the semiconductor module 20.

The invention is not limited to the heretofore described embodiment. A description has been given here with the inverter 10 driving the 3-phase motor M as an example, but the semiconductor module 20 can also of course be realized as the inverter 10 including the semiconductor switching element SW for a single phase or two phases, and the drive circuits thereof. Also, the clamping diode ZD can also of course be embedded in each of the upper arm drive circuits 6u, 6v, and 6w. Furthermore, it is sufficient that the voltage clamped by the clamping diode ZD, and the ratios of voltage divided by the voltage dividing resistors RA and RB, are fixed in accordance with the inverter 10 specifications, particularly the operating specifications of the semiconductor switching element SW. In addition to this, the invention can be modified in various ways without departing from the scope of the invention.

What is claimed is:

1. An inverter drive device for driving a semiconductor switching element that controls an output current of an inverter, comprising:
    a drive circuit configured to apply a drive voltage to the semiconductor switching element, to thereby turn the semiconductor switching element on and off, the turning off of the semiconductor switching element causing a counter electromotive force to be generated therein;
    a clamping diode configured to, upon the turning off of the semiconductor switching element, clamp a voltage of the generated counter electromotive force;
    a voltage dividing resistor configured to detect a voltage that is proportional to a current flowing through the clamping diode when the clamping diode clamps the voltage of the counter electromotive force; and
    an auxiliary drive circuit configured to generate a control voltage in accordance with the voltage detected by the voltage dividing resistor, and to apply the control voltage to the semiconductor switching element, to thereby turn the semiconductor switching element on.

2. The inverter drive device according to claim 1, wherein the semiconductor switching element is an insulated gate bipolar transistor (IGBT),
    the drive circuit is configured to apply the drive voltage to a gate of the IGBT, thereby driving the IGBT on and off, and
    the auxiliary drive circuit is configured to apply the control voltage to the gate of the IGBT, thereby turning on the IGBT in a saturated operation state.

3. The inverter drive device according to claim 2, wherein the clamping diode is formed of a Zener diode having a cathode-to-anode breakdown voltage lower than a collector-to-emitter breakdown voltage of the IGBT.

4. The inverter drive device according to claim 2, wherein the drive circuit includes a gate resistor, via which the drive circuit applies the drive voltage to the gate of the IGBT, and
    the auxiliary drive circuit includes an output resistor, via which the auxiliary drive circuit applies the control voltage to the gate of the IGBT.

5. The inverter drive device according to claim 1, wherein the auxiliary drive circuit is provided in parallel with the drive circuit.

6. The inverter drive device according to claim 1, wherein the semiconductor switching element includes an upper arm insulated gate bipolar transistor (IGBT) and a lower arm IGBT that are totem pole connected and alternately driven on,
    the drive circuit includes an upper arm drive circuit that drives the upper arm IGBT on and off, and a lower arm drive circuit that drives the lower arm IGBT on and off, and
    the auxiliary drive circuit is provided in parallel with the upper arm drive circuit.

7. The inverter drive device according to claim 6, wherein turning off of the upper arm IGBT while the lower arm IGBT is in an off-state generates a counter electromotive force in the upper arm IGBT, and
    the auxiliary drive circuit protects the upper arm IGBT from the counter electromotive force generated therein.

8. A semiconductor module, comprising:
    a semiconductor switching element configured to control an output current of an inverter; and
    an inverter drive device provided integrally with the semiconductor switching element for driving the semiconductor switching element, the inverter drive device including:
        a drive circuit configured to apply a drive voltage to the semiconductor switching element, to thereby turn the semiconductor switching element on and off, the turning off of the semiconductor switching element causing a counter electromotive force to be generated therein;

a clamping diode configured to, upon the turning off of the semiconductor switching element, clamp a voltage of the generated counter electromotive force;

a voltage dividing resistor configured to detect a voltage that is proportional to a current flowing through the clamping diode when the clamping diode clamps the voltage of the counter electromotive force; and an auxiliary drive circuit configured to generate a control voltage in accordance with the voltage detected by the voltage dividing resistor, and to apply the control voltage to the semiconductor switching element, to thereby turn the semiconductor switching element on.

9. The semiconductor module according to claim 8, wherein
the semiconductor switching element is an insulated gate bipolar transistor (IGBT),
the drive circuit is configured to apply the drive voltage to a gate of the IGBT, thereby driving the IGBT on and off, and
the auxiliary drive circuit is configured to apply the control voltage to the gate of the IGBT, thereby turning on the IGBT in a saturated operation state.

10. The semiconductor module according to claim 9, wherein the clamping diode is formed of a Zener diode having a cathode-to-anode breakdown voltage lower than a collector-to-emitter breakdown voltage of the IGBT.

11. The semiconductor module according to claim 9, wherein
the drive circuit includes a gate resistor, via which the drive circuit applies the drive voltage to the gate of the IGBT, and
the auxiliary drive circuit includes an output resistor, via which the auxiliary drive circuit applies the control voltage to the gate of the IGBT.

12. The semiconductor module according to claim 8, wherein the auxiliary drive circuit is provided in parallel with the drive circuit.

13. The semiconductor module according to claim 8, wherein the semiconductor switching element is a two-phase or three-phase semiconductor switching element.

14. A semiconductor module, comprising:
a plurality of semiconductor switching elements of a plurality of phases, configured to control an output current of an inverter; and
a plurality of inverter drive devices configured to respectively individually drive the plurality of semiconductor switching elements, each inverter drive device including:

a drive circuit configured to apply a drive voltage to the corresponding semiconductor switching element, to thereby turn the corresponding semiconductor switching element on and off, the turning off of the corresponding semiconductor switching element causing a counter electromotive force to be generated therein;

a clamping diode configured to, upon the turning off of the corresponding semiconductor switching element, clamp a voltage of the generated counter electromotive force;

a voltage dividing resistor configured to detect a voltage that is proportional to a current flowing through the clamping diode when the clamping diode clamps the voltage of the counter electromotive force; and an auxiliary drive circuit configured to generate a control voltage in accordance with the voltage detected by the voltage dividing resistor, and to apply the control voltage to the corresponding semiconductor switching element, to thereby turn the corresponding semiconductor switching element on.

15. The semiconductor module according to claim 14, wherein
the corresponding semiconductor switching element is an insulated gate bipolar transistor (IGBT),
the drive circuit is configured to apply the drive voltage to a gate of the IGBT, thereby driving the IGBT on and off, and
the auxiliary drive circuit is configured to apply the control voltage to the gate of the IGBT, thereby turning on the IGBT in a saturated operation state.

16. The semiconductor module according to claim 15, wherein the clamping diode is formed of a Zener diode having a cathode-to-anode breakdown voltage lower than a collector-to-emitter breakdown voltage of the IGBT.

17. The semiconductor module according to claim 15, wherein
the drive circuit includes a gate resistor, via which the drive circuit applies the drive voltage to the gate of the IGBT, and
the auxiliary drive circuit includes an output resistor, via which the auxiliary drive circuit applies the control voltage to the gate of the IGBT.

18. The semiconductor module according to claim 14, wherein the auxiliary drive circuit is provided in parallel with the drive circuit.

* * * * *